United States Patent
Glaude et al.

(10) Patent No.: US 10,986,790 B2
(45) Date of Patent: Apr. 27, 2021

(54) SYSTEM FOR INFUSING A GAS OR LIQUIDS INTO THE ROOTS OF A PLANT

(71) Applicants: Timothy Glaude, Canterbury, CT (US); Nicole Marie Proulx, Canterbury, CT (US)

(72) Inventors: Timothy Glaude, Canterbury, CT (US); Nicole Marie Proulx, Canterbury, CT (US)

( * ) Notice: Subject to any disclaimer, the term of this patent is extended or adjusted under 35 U.S.C. 154(b) by 211 days.

(21) Appl. No.: 16/169,260

(22) Filed: Oct. 24, 2018

(65) Prior Publication Data

US 2019/0183033 A1 Jun. 20, 2019

Related U.S. Application Data

(60) Provisional application No. 62/636,354, filed on Feb. 28, 2018, provisional application No. 62/599,725, filed on Dec. 17, 2017.

(51) Int. Cl.
| | |
|---|---|
| A01G 29/00 | (2006.01) |
| A01B 79/00 | (2006.01) |
| A01G 31/02 | (2006.01) |
| A01B 79/02 | (2006.01) |

(52) U.S. Cl.
CPC ............ *A01G 29/00* (2013.01); *A01B 79/005* (2013.01); *A01B 79/02* (2013.01); *A01G 31/02* (2013.01)

(58) Field of Classification Search
CPC ...... A01G 31/02; A01G 29/00; A01G 27/002; A01G 27/006
See application file for complete search history.

(56) References Cited

U.S. PATENT DOCUMENTS

| | | | | |
|---|---|---|---|---|
| 1,631,409 A | * | 6/1927 | Finn ....................... | A01G 27/04 47/80 |
| 4,385,468 A | * | 5/1983 | Yoshiaki ................ | A01G 31/02 47/14 |
| 5,285,595 A | * | 2/1994 | Shirato .................. | A01G 31/00 47/62 N |
| 5,296,180 A | * | 3/1994 | Hayes ..................... | A61F 2/28 264/44 |
| 5,298,205 A | * | 3/1994 | Hayes ..................... | A61F 2/28 264/414 |
| 5,763,067 A | * | 6/1998 | Bruggemann ...... | A61F 13/5323 428/317.9 |
| 6,103,358 A | * | 8/2000 | Bruggemann ...... | A61F 13/5323 428/317.9 |

(Continued)

FOREIGN PATENT DOCUMENTS

CN 208545189 U * 2/2019

OTHER PUBLICATIONS

NOx Control Technical Division Insittute of Clean Air Companies, Inc., May 2000: Copyright ® Institute of Clean Air Compnies, Inc., 2009.

*Primary Examiner* — Magdalena Topolski
*Assistant Examiner* — Kevin M Dennis
(74) *Attorney, Agent, or Firm* — Joel Douglas

(57) ABSTRACT

The present application relates to agriculture productions system that allows tor the controlled release of beneficial agents into a plant root mass, and more particularly it is beneficial for agriculture production where control of infusion of micro-nutrient, infusion macronutrient, root temperature control agents, nutrients and/or elements are applied to the root zone of a plant.

17 Claims, 13 Drawing Sheets

(56) References Cited

U.S. PATENT DOCUMENTS

| | | | |
|---|---|---|---|
| 6,233,870 B1* | 5/2001 | Horibata | A01G 31/02 47/59 R |
| 2,657,017 A1 | 6/2003 | Boxsell | |
| 7,823,328 B2 | 11/2010 | Walhovd | |
| 8,881,454 B2 | 11/2014 | Janney | |
| 9,149,005 B2* | 10/2015 | Janssen | A01G 31/00 |
| 9,210,806 B2 | 12/2015 | Douglas | |
| 9,363,957 B2* | 6/2016 | Cheng | A01G 31/02 |
| 9,566,565 B2* | 2/2017 | Grothe | B01J 35/1038 |
| 9,578,820 B2* | 2/2017 | Muthiah | B01J 20/22 |
| 9,877,443 B2* | 1/2018 | Muthiah | A01G 29/00 |
| 10,130,050 B2* | 11/2018 | Hempenius | A01G 22/00 |
| 10,492,383 B2* | 12/2019 | Abu Al-Rubb | A01G 9/243 |
| 2007/0113472 A1 | 5/2007 | Plowman | |
| 2013/0067812 A1* | 3/2013 | Masters | A01G 27/02 47/81 |
| 2013/0111811 A1* | 5/2013 | Miyauchi | A01G 9/246 47/57.7 |
| 2013/0115154 A1* | 5/2013 | Grothe | B01J 35/109 423/239.1 |
| 2014/0223817 A1* | 8/2014 | Simon | A01G 31/02 47/59 R |
| 2015/0245566 A1* | 9/2015 | Muthiah | B01J 20/28016 47/66.7 |
| 2015/0342133 A1* | 12/2015 | Nakajima | A01G 31/06 47/62 R |
| 2016/0135391 A1* | 5/2016 | Fenton | A01G 27/04 47/48.5 |
| 2016/0278312 A1* | 9/2016 | Muthiah | E02B 13/00 |
| 2018/0084732 A1* | 3/2018 | Wetzel | A01G 7/02 |
| 2018/0220603 A1* | 8/2018 | Burford | C05G 5/20 |
| 2018/0368346 A1* | 12/2018 | Watson | A01G 29/00 |
| 2019/0124861 A1* | 5/2019 | John | A01G 29/00 |

* cited by examiner ated to the plant growth and the environment by reducing the free $CO_2$ in the atmosphere.

SYSTEM FOR INFUSING A GAS OR LIQUIDS INTO THE ROOTS OF A PLANT

CROSS-REFERENCE TO RELATED APPLICATION

This application claims priority from U.S. provisional patent application Ser. No. 62/599,725, filed Dec. 17, 2017, entitled, A Soil Modification System and U.S. provisional patent application Ser. No. 62/636,354, filed Feb. 28, 2018, entitled, Soil Modification System for $CO_2$ Infusion each of which is hereby incorporated by reference herein for all purposes.

STATEMENT REGARDING FEDERALLY SPONSORED RESEARCH OR DEVELOPMENT

The research for patent, "System for infusing a gas into the roots of a plant," was not funded by any federally sponsored research or development.

FIELD

The invention relates to a device for the infusion of a fluid such as a liquid or gas such as $CO_2$ or water into the area adjacent to plant root systems.

BACKGROUND

Field of the Invention

The present application relates to agriculture productions systems, and more particularly to agriculture production systems with a temperature, nutrient and/or element (e.g., micro-nutrient, macronutrient, root aeration and a controlled root zone.

Description of the Related Art

The continued growth in the world's population has increased the demand for food production, and the need for greater agricultural production systems and methods that allow increased agricultural production in existing areas of cultivation. Conventional agricultural systems, where plants are grown in soil and the use of expensive fertilizers is used to stimulate increased growth and productivity are unsuitable due to the negative effect on the environment. However, because of the large number of people needing to be feed the need for industrial agriculture is more important. The 2018 red tide algae bloom which occurred in southwest Florida is a good example of the issues that are associated with broad application fertilizer-based farming methods.

Additionally, it is well known that plant life absorbs and uses $CO_2$ in the photosynthesis process and that plant raised in a high $CO_2$ environment grow faster and are more productive in producing fruit and seeds. However, it is not practical to increase $CO_2$ in the atmosphere surrounding the plants because of the negative effects of $CO_2$ with respect to climate change and global warming. Additionally, if a method could be developed that could provide a controlled release of $CO_2$ so that the $CO_2$ did not have to be globally applied to the plants then that would provide a means of sequestering the $CO_2$ in plants and would provide a benefit to the plant growth and the environment by reducing the free $CO_2$ in the atmosphere.

It is also well known that the amount of water needed to grow food on an industrial scale is enormous and that a significant amount of the water applied to crops is lost to evaporation. Even drip irrigation systems lose a significant amount of the applied water to evaporation. Therefore, there is a need for a system to supply water in a more selective manner than drip of other traditional forms of irrigation.

It is well known that various inventors have attempted to solve the need for economical increased agricultural production for example U.S. Pat. No. 8,881,454 issued to Janney on Nov. 11, 2014 describes a system of interconnected irrigation units to control the delivery of water and temperature control. U.S. Pat. No. 6,574,917 issued to Boxsell on Jun. 10, 2003 presents an apparatus which reliably and efficiently provide hydroponic growing environment, U.S. Pat. No. 7,823,328 issued to Walhovd discloses a hydroponic system for growing plants, U.S. Pat. No. 9,578,820 issued to Muthiah et al. discloses a system for underground watering, US Patent application 20070113472 applicant Plowman discloses an aeroponic system for propagating plants and/or seeds. The disclosure of which hereby incorporated by reference herein for all purposes.

Therefore, there is a need for a method to increase the productivity of plant while minimizing the amount of chemicals used to fertilize use to grow the plants.

Additionally, there is a need to create a system which will allow plants to utilize increase $CO_2$ which will benefit the plant by stimulating growth and the environment.

Additionally, there is a need to system which will allow agricultural growers to infuse fluids such as a liquid or gas such $CO_2$ or water into the area adjacent to plant root systems.

BRIEF SUMMARY OF THE INVENTION

Accordingly, there need for an improved agriculture production system that can be used to grow plants such that their production rate and rate of growth is increase. It is therefore a primary objective of the invention to provide a means of stimulating plant growth such that the plants mature fasted and produce higher yields by allowing agricultural growers to infuse fluids such as liquids or gases such as $CO_2$ or water into the area adjacent to plant root systems.

Another objective of the invention is there is a need to more $CO_2$ in the production of plant matter which increases plant growth and productivity and removes $CO_2$ from the atmosphere.

Another objective of the invention is to reduce the use of fertilizer by providing a means to distribute the fertilizing agents in a surgical manner to improve plant productivity.

Another objective of the invention that the there is a need to minimize the amount of water used to grow plants.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF CERTAIN EMBODIMENTS

Figure 1:
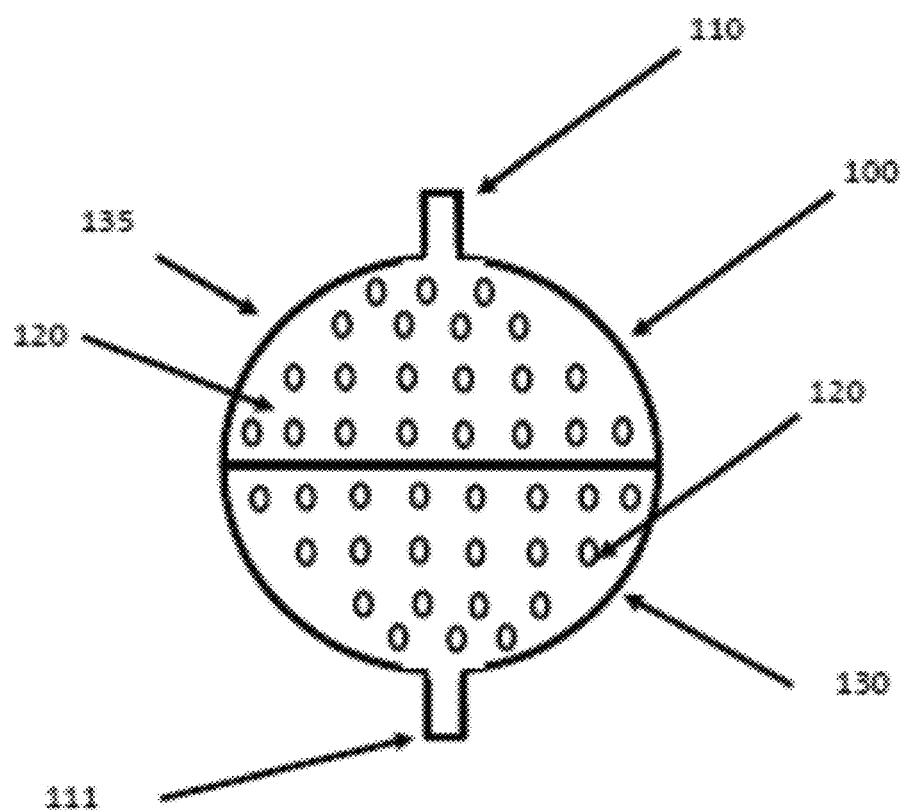
FIG. 1 shows an elevation view of an embodiment of the invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the resent invention may be practiced without some of these specific details. Several embodiments are described herein, and while various features are ascribed to different embodiments, it should be appreciated that the features described with respect to one embodiment may be incorporated with other embodiments as well. By the same token, however no single feature or features of any described embodiment should be considered essential to every embodiment of the invention, as other embodiment of the invention may omit such features.

All publications, patents and patent applications referred to herein are incorporated by reference in their entirety to the same extent as if each individual publication, patent or patent application was specifically and individually indicated to be incorporated by reference its entirety. In the event of inconsistent usages between this document and those documents so incorporated by reference, the usage in the incorporated reference(s) should be considered supplementary to that of this document; for irreconcilable inconsistencies, the usage in this document controls.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Numerical values for volumes and masses in this specification are shown in U.S. customary units. Teaspoons and tablespoons are taken as their volumetric equivalent units in the Avoirdupois system. Since accelerations and forces are not relevant to the description or use of the invention, U.S. customary units of weight such as ounces and pounds shall indicate their customary equivalent masses as stationary objects.

With respect to the term fluid it can mean any of the following materials or combinations of gas or liquid materials thereof including $CO_2$, air, pest control agents, disease control agents, water, liquid fertilizer, gas emission of a fossil fuel burning device, $O_2$ and Nitrogen.

The device of the invention creates a chamber which is resistance to collapsing and fouling by soil and grow medium used to support the plant. The instant invention is a device/system used for multiple injection methods to inject $CO_2$ into the root system of a plant or plants. A preferred method of injection for grow balls is injecting sequestered $CO_2$ to help companies lower $CO_2$ emissions and produce sustainable crops that could then be used as biomass, fuel or sold as goods.

The instant invention device in this application works by utilizing the device and our custom methods of injecting the fluids into the root mass of plants. The invention facilitates the construction of custom infusion systems to facilitate growth of plant matter. The instant invention allows agricultural growers to infuse fluids such as liquids or gases such as $CO_2$ or water into the area adjacent to plant root systems. However, for each application the configuration is different and specific to optimize the plant development while creating the optimum environment for the plants being grown thereby creating a sustainable ecosystem capable of optimizing the growth of the plants being raised and still allowing for the optimum sequestering and the resulting lowering of $CO_2$ emissions. The reason for this optimization process is that climates in which the device will be used vary such that in some instances the environment may be hot and arid or hot and damp, or cold and arid or cold and damp climates. The instant invention achieves its objective of increased plant growth by injecting sequestered $CO_2$ emissions into a series device described in the instant invention and then the $CO_2$ is diffused through the device into the soil or hydroponic solution which promotes the increased growth by bathing the plant root system with beneficial $CO_2$.

The devices of the instant invention are connected by using supply lines which feed fluids such as liquid or gas such as $CO_2$ or water from a supply system such as a gas supply containing $CO_2$, an exhaust system from an internal combustion system, an exhaust system from a combustion system such as power plant or heating system. However, any $CO_2$ generation device would be applicable. When a combustion device is used to supply the $CO_2$ the supply lines connected to the exhaust in such a way as the emissions compressed and flow through the tubing connecting the devices of the invention which transfer the $CO_2$ to the plant roots.

Depending on the area and climate in which the device is used to grow the plants the emissions may need to be cooled before injecting into the device of the invention so that the plants roots are not damaged by the increase heat of the exhaust. The inventor envisions using geothermal cooling for the cooling step but there exist numerous means of reducing combustion gas temperature which are all possible means to reduce the emissions temperature such as running the emission line through a cooling bath or refrigeration unit. Any method to achieve a cooler gas temperature which does not damage the plant roots and is cost effective can be used.

When more than one device is connected it forms an infusion system for $CO_2$ into the plant roots. The systems, growing methods and crops used with the device of the instant invention will vary depending on the location of the of the plans and the associated climate which are hosting the plants. Some missions may need to be heated so that the root of the plants is not negatively affected by the cold $CO_2$ gas used in the application. The device will also be altered depending on the conditions of the environment, growing method or injecting method needed to achieve reduced emissions. Alterations on materials used for the device of the instant invention may be required.

The device of the instant invention can be fabricated from any material which will support the distribution of gas to the plant roots. Materials such as wood, fiberboard, paper, plastic, ceramic, glass, stainless steel, copper, aluminum and other metals may be used in the construction of the device to ensure longevity of the in device of the instant invention and to ensure the system works properly to reduce emissions and produce sustainable.

The device of the instant invention is designed to provide at least one inlet. However, the design of the device of the instant invention is preferably designed to have at one inlet and one outlet so the device of the invention can be assembled in to circuits that are either parallel or serial configuration. The system is configured such that the support inlets are used to connect tubing which forms the injection lines which are connected to the $CO_2$ source. The size of the tubes will vary depending on the size of the inlet and the connection used to secure the injection lines. The tubes are preferable ¼ inch in size, such as the Toro Blue Strip ¼ inch drip irrigation tube. The tubes may also be configured to have small holes to assist in the infusion of fluids such as $CO_2$ or other gas liquid. In certain configurations the tubing is either connected with a threaded connection or is press fitted over the injection port on the device. The device size may also vary depending on the size of the system in which the device of the instant invention is incorporated in. Some systems may require a very large device of the instant invention depending on the amount of emissions being sequestered into the system. The shape of the device of the instant invention is configurable and can be selected from the shapes consisting of balls, round disk, triangles, rectangles, squares, octagons, pyramids, tubes and cones as long as the shape permits the diffusion of the $CO_2$ and provides an adequate volume of gas to beneficially bath the root system of the plants with the $CO_2$. The shape must be adaptable for the connection of tubing to supply the fluids such as liquid or gas and provide room for a plurality of diffusion holes to inject a fluid such as liquid or gas to the grow medium adjacent to a plants roots.

The ideal diameter of the diffusion holes depends on the fluids such as liquid or gas being supplied to invention for diffusion into the surrounding grow medium and the grow medium being used. For example, when a gas is used such as air in a hydroponic system the hole size should be small enough to create resistance so that the gas does not free flow into the grow medium. The hole size for air in a hydroponic system can be selected from 0.03 mm to 0.1 mm. However, when the grow medium is peat moss the hole size for air can be selected from 0.5 mm to 0.5 mm. When a liquid is used the diffusion holes the diffusion hole size can be selected from 0.3 mm/0.11 inches to 0.9 mm/0.035 inches.

The distance that the device is located from the plant root mass in the grow medium is important and the distance should be greater than 3 mm and not further than 13 mm so that the infusion process can fully bath the plant root mass by the diffusion holes injecting the fluids such as liquid or gas into the grow medium surrounding the plan root mass and the root mass being able to absorb and use the fluids such as liquid or gas. Specifically the device of the invention is adapted for the diffusion of fluids such as liquid or gas into the grow medium adjacent to the root mass of a plant and the device of the invention is in the shape of a three dimensional geometric shape which is hollow and has holes for diffusing a fluid such as liquid or gas into the said grow medium and the device being located a sufficient distance so that the grow medium is capable of absorbing the fluid such as liquid and gas and providing an accumulation buffer for emission so that the device of the invention, grow medium and the plant root mass forms a efficient sequestering system for specific components of the emission liquid or gas such as $CO_2$.

The emissions of the fossil fuel burning device can be mixed with a variety of liquids or other gasses which will promote the utilization of the components of the emission such as $CO_2$.

In one embodiment the device of the instant invention could be made from a sponge material such as PVA sponge which is a synthetic sponge essentially composed of Polyvinyl Alcohol. A PVA sponge has an is an open-celled structure which allows the gas to permeate and bath the roots of the plant. When a sponge is used as the transfer medium of the invention a hose is run through the sponge that has small diffusion holes that completely penetrate the tube walls and allow the $CO_2$ to bath the roots of the associated plants. The material of the sponge can be selected from any suitable sponge material such as synthetic sponges' material selected form the group consisting of polyester, polyurethane, or vegetal cellulose. Vegetal cellulose sponges made of wood fiber are more used for bathing and skin cleaning, and are usually tougher and more expensive than polyester sponges. They are considered more eco-friendly than polyester sponges as they are biodegradable and made of natural materials. The benefit of using a Vegetal cellulose sponge is that the material will eventually degrade over time and will form an excellent composed material which reduces the negative effect of a hard-plastic ball when looking at single use applications.

Regardless of the type of material used to form the device of the instant invention the size of the diffusion holes which allows the emissions to diffused and bath the roots of the associated plants may also need to be altered again due to the amount of emissions being injected into the device or system.

The device can be used in different style growing systems, such as hydroponic systems to regular soil containers or directly into the earth. The device of the instant invention should be placed so they are in the root zone of the plant. The plant then acts as a filter to uptake the sequestered $CO_2$ and carbon emissions. Plants which can benefit from bathing of $CO_2$ include hemp, wheat, corn, alfalfa, sunflowers, peppers and squash. Many of these plants would act as filters. Studies have shown that hemp can uptake toxic carbons, filter them out and the plant is then tested and is free of any toxins. The use of the device of the instant invention when utilized plants capable of beneficially utilizing the $CO_2$ and taking it in through their root systems allows the plant to grow faster and achieve increase fruit or seed production. When used with bell peppers the plants reached maturity twice as fast as plants not utilizing the device of the invention and they produced approximately 1.5 times the fruit or seeds. The increase in biomaterial also provides additional benefits as it allows those farmers to also produce increased biomass which can be used in the production of methane for fuel.

The increase in growth rates benefits the farmer utilizing the device of the invention in two ways the first is the increased fruit/seeds and the second is the increase in biomass for conversion to methane. This allows the farmer selling the crops or utilize them for biofuel production by turning plant to biomass into fuel, or sellable product to create amore product in less time thereby increasing the yearly yield of the cultivated area.

When injecting the plant with $CO_2$ utilizing the device of the instant invention there is another benefit to the plant. In most situations there is also an increase on oxygen that is also being introduced to the plant root system at the same time. The added oxygen which is being provided along with the sequestered $CO_2$ emissions will help improve the uptake of the carbon and emissions in a hydroponic solution of soil-based grow medium. The reason that this is beneficial to the plant especially those grown in a hydroponic solution is that the increased oxygen levels in hydroponic solutions increase plant growth and keep water healthy from disease. In turn helps plants uptake more water, nutrient and any other beneficial additives added by the farmer such as fertilizer or pesticides.

Note when infusing $CO_2$ or sequestering $CO_2$ laden gasses in applications such as indoor application in which the plants being raised act as filtering agents may require conditions to be modified to control temperature, moisture, and other nutrients so that the plants can maximize their growth and production. One embodiment of the invention is that the plants can be placed in indoors conditions where the climate is stable and controller. Alternatively, the invention can also be used in applications utilizing out door planting beds. In these areas the climate may not be able to provide a suitable controlled environment, but the use of invention allows the grower to modulate the environment by adding heat, cooling the roots, adding water, or other nutrients to promote plant growth.

When the device of the invention is used with emissions as the fluids such as liquid or gas the distance that the device is located from the plant root mass in the grow medium is important and the distance should be greater than 6 mm and not further than 20 mm so that the infusion process can fully bath the plant root mass by the diffusion holes injecting the fluid such as liquid or gas into the grow medium surrounding the plan root mass such that the root mass is able to absorb and use the fluid such as liquid or gas. The greater distance allows the surrounding grow medium to absorb the gas or liquid and this helps the plant process the emissions. This is a unique feature of the invention because the plant root mass, grow medium and the device of the invention become integrated into a mechanism to remove toxins from the emission and clean the emissions so that they emit fewer unwanted emission by products into the air.

By building an indoor controlled environment or greenhouse enclosure any crop can be grown and more emissions could be used by the plants. The reason for this is $CO_2$ emissions have been shorn that they can be absorbed by the root mass and the $CO_2$ that escapes from the grow medium or soil can be utilized directly by the plants foliage. This mechanism also helps increase the yield and when used in a cold climate the warm emission acts as a heat source for environment which also increases production.

Depending on the emissions and carbon types in emissions being created certain nutrients can be added to the hydroponic solution or soil/grow medium to counter negative impact from any toxins or carbons that may be present in emissions. In turn added nutrients will help plants uptake more emissions and water making the plant stronger and healthier. $CO_2$ being injected into the hydroponic solution, soil/grow medium or root mass will also have positive effects on the plants in the system. This is supported by studies which show that when $CO_2$ was added to a plant's root mass the resulting plants achieved greater yields. Additionally, plants grown with a root-based $CO_2$ infusion system will also uptake more $CO_2$ and the plant will act as a filter and remove the $CO_2$ from the hydroponic solution, grow medium or soil. Along with emissions, beneficial nutrients and oxygen can also be added to solution to promote healthy plant growth to increase emissions/carbon uptake and improve crop production. Studies have also shown on the Chernobyl site that certain plants are able to uptake carbons from soil and help reduce the amount of toxins and carbons in the soil. Then when the plant is tested no toxins were present in the plant. One type of plant that has been documented in the Chernobyl site study is hemp. The hemp appears to have processed and expelled the toxins.

Additionally, by utilizing a deep-water culture method of hydroponics and the instant invention $CO_2$ emissions can be effectively utilized and processed by plants which will reduced the $CO_2$ escaping into the atmosphere. The invention therefore can effectively sequester $CO_2$ and by using the instant invention and applicable grow system a commodity such as hemp, alfalfa or wheat can be grown, and the resulting plants will grow faster and create more biomass and fruit or seeds. Alternatively, there are many other useful crops which could be produced and be used to filter the $CO_2$ out of the emissions. The resulting crops could be used, and the biomass nonfood grade could be used for alternative products.

Specifically, the biomass from the crops produced could be converted into fuel utilizing digestion or dried and burned in a biomass furnace. This would be in addition to the sale of other useable products that are harvested from the plants.

By utilizing hydroponic methods of growing the plants raised utilizing the instant invention be able to readily uptake the injected sequestered emissions and filter them out resulting in a reduction in $CO_2$ being expelled into the atmosphere. Studies have shown that root infused $CO_2$ will result in increased plant biomass yield. The invention creates a system that can be used in a variety of growing systems or grow medium including water, soil, coco coir, perlite, peat moss, vermiculite, rockwool, growstones, clay pebbles and any other medium or solution required per application. Depending on the location and climate in which the instant invention is to be used the type of emissions being sequestered and desired crops to be grown will determine what growing application will be used in conjunction with invention. The environment will also determine the material used to construct the instant invention and the type of line connections needed on support each end of device. Note the instant invention can be made with either a single or multiple inlet/outlet to support the installation. For example, a multiple inlet/outlet device of the invention can be used as a distribution node for the liquids or gases such as $CO_2$ bearing gas or water. The instant invention is most commonly made with one inlet port and one outlet port to allow them to be connected in series to form a recirculation system to allow even pressure throughout installation. A device of the instant invention that is constructed with one inlet port and one outlet port also allows for a greater variety of applications than a device of the instant invention with only one inlet.

The instant invention can be used alone by connecting lines to each inlet and outlet port of device to a TEE such as a "Toro Blue Strip Drip tee" can be used to connect the device of the instant invention to a single supply line or to the main $CO_2$ injection line. The main $CO_2$ injection line is preferably a Toro Blue Strip ½ inch tube. Alternatively, the outlet port can be plugged or terminated with a capping device such as a plastic or metal plug to terminate the series of devices by inserting the plug into the outlet which stops the flow of the such as $CO_2$ or gas or liquid being infused by the device of the invention.

The instant invention can also be used for injecting fluid such as water, $CO_2$, and or nutrient bearing solutions into soil or grow medium. The device of the invention can be used directly by placing it in the grow medium local to the plant or in potted plants. Typical materials that can be infused into the area surrounding the root mass of a plant using the device of the invention include $CO_2$, air, pest control agents, disease control agents, water, liquid fertilizer, $O_2$, gas emission of a fossil fuel burning device, Nitrogen, gas emission of a fossil fuel burning device or whatever any other agent that can be transported by a liquid or gas medium. The invention can also be used to heat or cool the soil or grow medium by either heating the gas or liquid to the desired temperature and allowing it to infuse the root mass adjacent to the device of the invention. When used with a hydroponic system the device of the invention can transport or recirculate the medium providing both nutrients, $CO_2$ while also heating or cooling for the subject plants. When the invention is connected to an air pump then hot or cold air can be diffused into the invention resulting in heating and cooling the grow medium or hydroponic solution. This method could also be used for heating and cooling any solution/water in which there is a need provide heating or cooling of a local environment such as pools, fish tanks, reservoirs, etc.

The instant invention can also be used for injecting air or solutions into fish tanks, ponds, pools, hot tubs, reservoirs or any medium requiring added oxygen or $CO_2$ levels. The invention could also be used to disperse chlorine into pools or ph modifying solutions for fish tanks or pools. This is possible because the invention provides a scalable means of injecting a fluid such as liquid or gas into a medium such as soil, water of grow medium. The invention can also be constructed with materials placed inside such as silver, copper or other anti-bacterial agent used to kill bacteria in water. The removal of the bacteria provides a more conducive environment for the plant which promotes plant growth. Additionally, various materials that break down slowly over time can be placed in the instant invention and then the air or water will slowly pick up the specific agents and then inject them into the grow medium. The instant invention can be used as a standalone device which is placed adjacent to a root mass to infuse beneficial agents into the area adjacent to the root mass, so the plant can absorb the agents and utilize them in their growth process.

In another embodiment of the instant invention can be used to add $CO_2$, pest and beneficial agents which include fertilizer, pest and disease control agents to improve the growing environment for the plant. The infused $CO_2$, fertilizer, pest and disease control agents when injected in to the grow medium adjacent to the plant roots can be absorbed by the root system of the plant or migrate through the grow medium to become airborne and absorbed by the plant through the above ground plant structure such as stems, leaves and flowers. The $CO_2$ can come from organic for of $CO_2$ or from the $CO_2$ from emissions of fossil fuel burning machinery. When the $CO_2$ is provided from a non-emission source then the invention can utilize tanks filled with $CO_2$ to provide the necessary $CO_2$. The fertilizer, pest and disease control agents can also be organic, or man made from petrochemicals or other chemical composition. The various embodiments of the invention can be connected in series or parallel and when connected to the appropriate supply lines will provide the distribution system for the $CO_2$ and other beneficial agents including fertilizer, bug and disease control agents. Note all supply lines can be connected above and below ground to effectively diffuse injected materials above and below ground disk and maintain even pressure so that the system comprising of the diffusion devices of the invention can effectively saturate the desired area and the material diffused is avail to the plant to use in the conversion to plant material. The tubing connecting the devices of the instant invention can also be perforated to allow the infusion of the fluid such as gasses or liquids into the plant root mass.

When the invention is used in sealed grow room applications the instant invention is place strategically so that the plant root mass can be infused with the fluids such as $CO_2$, air, pest control agents, disease control agents, water, liquid fertilizer, $O_2$, gas emission of a fossil fuel burning device, Nitrogen, gas emission of a fossil fuel burning device, gasses or liquids and other beneficial agents including fertilizer, bug and disease control agents which are delivered to the plant to promote high yields and will help the growers control or eliminate insects and disease which is beneficial to the plants being treated. The device of the invention is particularly useful in controlling the $CO_2$ and other beneficial agents including fertilizer, bug and disease control agents when plants are grown in sealed grow rooms, greenhouses and directly outdoors. By utilizing the invention systems, the growers do not have to use harsh chemicals or sprays on the plants which promotes the organic approach to increasing yields and controlling bugs and disease.

The instant invention is device that has wo pots on each side of the device. The ere is an inlet and an outlet port which facilitate connecting tubing to the device. The instant invention can be made from many materials including wood, fiberboard, paper, plastic, metal, aluminum, sponge, fiberglass, organic fiber and any other substance that may be required in specific applications. The invention is preferable shape as a hollow ball and can either be made in one or two pieces. When the device is made in two pieces the pieces can either be threaded or configured to latch together over a lip to connect the two halves. However, the instant invention can be made in any shape depending on the application needed. Typical shapes include round disk, oval, cubes, pyramid or cylinder shapes. When configured as a cylinder they can be incorporated into the tubing system to make installation easy. The instant invention can either be made with diffusion holes for diffusing air water or other substances, or solid if nothing is required to be released from device. A good example of a device of the invention without the diffusion holes is a device used to warm the soil or grow medium surrounding a plant root mass.

The instant invention with diffusion holes provide a means for the $CO_2$ and other beneficial agents including fertilizer, bug and disease control agents to migrate from the inner cavity of the round disk, oval, cubes, pyramid or cylinder shape embodiments to the grow medium adjacent to the plant root mass. A typical manufacturing process would be to use injection molding to make the round disk, oval, cubes, pyramid or cylinder shapes. However other manufacturing methods can be used such as 3-D printing or machining can be used to form the vice of the invention.

The instant invention without diffusing diffusion holes are used when no substance is needed to be emitted from ball. Solid embodiments of the invention would be used in one instance (but not limited too) where hot or cold air or water is injected into the round disk oval, cubes, pyramid or cylinder shape embodiment to heat or cool the grow medium which surround disks the plant root structure. This allows the heat or cooling of the plant root system to minimize environmental control of the grow chamber/room.

The device can be made in two pieces, so that beneficial materials can be placed inside the device of the invention which then is leeched out into the grow medium where it is absorbed by the plant root mass. This method of deployment of beneficial agents including fertilizer, metals, bug and disease control agents placed inside the invention is an easy way to effectively distribute these agents to all plants and minimize the amount of the materials distributed to the plants because of the localized infusion of the grow medium which is in communication with the plant roots. The device can be configured as one piece, or two pieces and the final configuration is user definable based on their needs and the manufacturing methods available to make the round disk, oval cubes, pyramid or cylinder shape embodiments.

When the instant invention is configured in a two-piece embodiment it allows the grower to place a small weight inside to keep ball from floating when using in water-based system such as some form of hydroponic agriculture. Suction cups, hooks, tie wraps, string etc. can also be used to hold a device to a weight keep device of the instant invention from floating. The inlet and outlet ports, nipples or Barb's on either end of the device of the invention can be made in multiple sizes to allow for different types of line to be connected. The connectors on each end of the ball, round disk, oval, cubes, pyramid or cylinder shape embodiment that forms the device of the instant invention can either be Barbed, threaded smooth, tapered compression fitting style connection or any other style needed for connecting certain types of supply lines to the device of the invention. The instant invention can be made in any size or shape needed for the application in which they are being used.

The instant invention can be used as a standalone device in which they are placed in a hydroponic solution or directly in the ground/soil, grow medium or potted plants. One method in which the device which is either a ball, round disk, oval, cubes, pyramid or cylinder shape or other embodiment that forms the instant invention can be used without supply lines or pumps is by placing inside the device an organic form of Mycelia and food for the Mycelia to create $CO_2$. Mycelia are the fibrous, root-like networks formed by fungi throughout a substrate. The Mycelia Fungi are more closely related to animals than to plants; like animals, they exhale $CO_2$ as they grow without giving off any excess heat or requiring complicated set-ups. When the round disk, oval, cubes, pyramid or cylinder shape embodiment that forms the instant invention is placed in a plants root zone where the $CO_2$ slowly overtime is omit from the device of the instant invention the Mycelia utilize $O_2$ and the $CO_2$ promotes increase crop production by allowing it to be absorbed by plant and then the plant utilizes the $CO_2$ in the photosynthesis process to produce more plant matter. If a pesticide is placed in ball in the same manner it would prevent bugs/pest from laying eggs in soil around disk the plant and would kill the pest/bugs providing healthy root zone which promotes plant yields. The $CO_2$ tanks could also be placed inside the ball creating an organic method of growing the plants. The tanks could then slowly admit $CO_2$ overtime to help increase yields. Organic and or none organic pest and disease control could also be placed inside the ball to help maintain healthy medium/soil/water and surround disking air conditions.

The instant invention can be used in e greenhouse setting to provide a means of heating the soil to help keep plants alive during times when there are freezing conditions. This provides a lower alternative to heating the entire greenhouse. To accomplish this the device of the invention is placed in the soil adjacent to the roots of the plant and then a fluid such as warm air or liquid containing enough antifreeze to prevent the liquid from freezing is forced through the devices to heat or cool the adjacent soil. The device of the instant invention is then attached to one another in series from pot to pot using the appropriate supply line. This allows warm air can be injected into the lines keeping the soil at the required temperature depending on crop being grown. This will also increase plants uptake of the nutrient laden solution and help prevent root rot and increase yield. By aerating the soil surrounding the plant roots and providing only water and nutrients that are need for the plant to thrive will prevent the occurrence of damage to the plant due to root rot. This is an ideal preventive maintenance procedure to ensure that the plants thrive and maximize their growth. The device of the instant invention can be configured either with or without diffusion holes in device. When the device is configured without diffusion holes the device main purpose is to control soil or water temperature surround disking the plant roots. The device of the invention configured without diffusion holes can be in the shape of a ball, round disk, oval, cubes, pyramid or cylinder shape embodiment achieves this by the user configuring the device such that it is connected to a pumping system which is capable of pumping warm or cold air or water through the connected devices to control the temperature of the roots and surround soil or grow medium. The device in this configuration can be connected to multiple devices in series or parallel or as individual devices. When connected the system can treat any number of plants. The solid device configuration is limited and can only be used if there is no requirement for the system to deliver any fluids such as water with nutrients, air, water, nitrogen, gas emission of a fossil fuel burning device or $CO_2$ to the plants being treated and the user only wants the device to modulate the temperature of the plant roots and surrounding soil. When there is a need to diffused fluids such as water with nutrients, water, nitrogen or $CO_2$ from the device the user will select a device that has small diffusion holes formed into the shell of the device which can meter the fluids such as water with nutrients, water, nitrogen or $CO_2$ to the plant roots or surround disking soil. Note both the solid device or the device with diffusion holes are used in multiple applications either as an individual device or in series to achieve the optimum growing conditions desired by the grower.

The benefits of the instant invention in large-scale greenhouse operations are obvious.

One benefit is the reduction in overall heating that a greenhouse owner would have to do if they utilized the device of the instant invention to locally heat the plant thereby minimizing the heating requirements for the entire greenhouse, because only the soil is needed to be warm in most cases to keep plants alive. By injecting heat using air or water threw the lines connected to the instant invention device located in root mass this would keep roots warm and plants alive.

Additionally, by adding the instant invention to the potted plants less soil is needed saving on soil cost.

Additionally, by using the instant invention which is connected to a $CO_2$ source then the $CO_2$ can be injected into the soil in communication with the roots of the associated plant there by stimulating increased plant growth and preventing bugs from laying eggs in the soil. High levels of $CO_2$ being injected into the room mass will not only prevent bugs and other pest, but it will kill them which reduces the amount of pesticides needed to raise the plants.

Additionally, by using the device of the instant invention and injecting oxygen into the soil increases yields, prevents root rot and allows plants to uptake more water and nutrients. However, the invention is well suited to allow agricultural growers to infuse liquids or gases such as $CO_2$ or water into the area adjacent to plant root systems.

Additionally, plants could also be watered through the same system in which $CO_2$ and air is being injected and this would save on labor costs. The system would have to be configured to allow only one infusion material at a time with the required pumping and valve system to connect the various sources of to the device of the instant invention.

Additionally, when is injected directly into the soil adjacent to the plant roots the device of the instant invention will help maintain an algae free soil by not allowing light to come in contact with water, this will also help maintain healthy environment for growing the plant.

The device of the instant invention be used in numerous application where dispersing an agent in a control manner is desired. Agricultural applications include growing plants for human or animal consumption, to produce biomass.

Additionally, the device of the instant invention can be used to inject bottled or organic $CO_2$ into a sealed environment or sealed room to raise ppm of levels of $CO_2$ to achieve a certain goal like killing pest or increasing yield.

The device of the instant invention can be hung from plants to keep bugs, pest or animals away by either injecting with repellent or just placing replant inside the device and utilizing the air being introduced into the system to carry the repellent out of the device through the diffusion holes in the device.

The device of the instant invention can also be used to intake air or any substances by connecting the supply lines to a vacuum source so that the air is drawn into the device of the instant invention.

The device of the instant invention can add oxygen or any substance to soil or other grow medium by setting up natural draft method. To accomplish this the user will connect the inlets with tubing and then bury the device under the soil surrounding the roots of the plants. The tubing connected to the inlet and outlet ports will run out of the soil into the open air. By doing this a draft is created allowing air to be infused into the soil without having to connect it to an air pump or other source. This connection method can be used when there is no power source available.

The device of the instant invention can also be set up in what we call the siphon method. This is done by connecting each inlet to supply lines then the supply lines are connected to the liquid needed to be siphoned into the device. This application can also be used when there is a need to inject a solution into the soil adjacent to a plants roots and there is no power source available.

The device of the instant invention relates to agriculture productions systems, and more particularly to agriculture production systems with a temperature, nutrient and/or element for dispersing micro-nutrient, macronutrient, root aeration into a controlled root zone referred to as a grow medium and related area which is adjacent to the plants root mass.

Referring to the FIGS. 1-11. FIG. 1 shows an elevation view of an embodiment of the invention which is a ball 100 made from plastic and comprises of a top section 135 and a bottom section 130. Top section 136 has plurality diffusion holes 120 and infusion port 110 and Bottom section 130 has a plurality diffusion holes 120 and infusion port 111.

Figure 2:
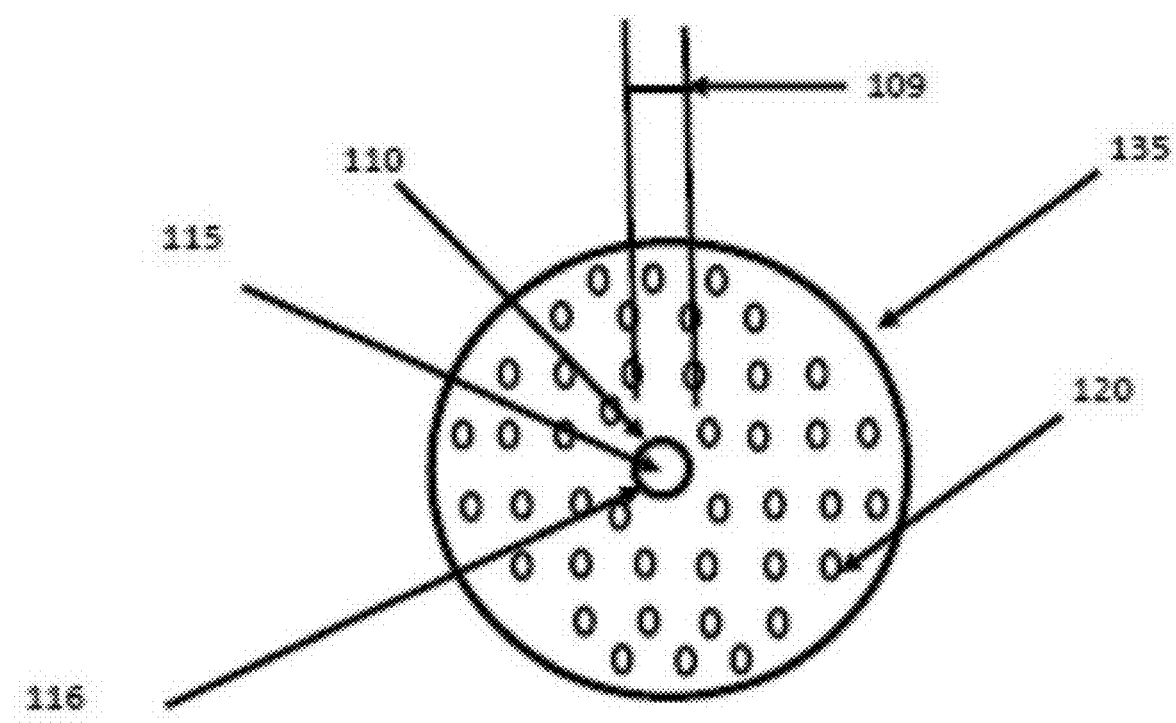
FIG. 2 shows a plan view of an embodiment of the invention.

FIG. 2 shows a top plan of an embodiment of the invention which is a ball 100 made from plastic and shows the detail of infusion port 110 which has hole 115 and wall 116. The diameter 109 of infusion port 110 is design to fit within tube 108 so that the exhaust 510 or $CO_2$ 900 will not escape from the tube when the tube is transporting either exhaust 510 or $CO_2$ 900.

Figure 3:
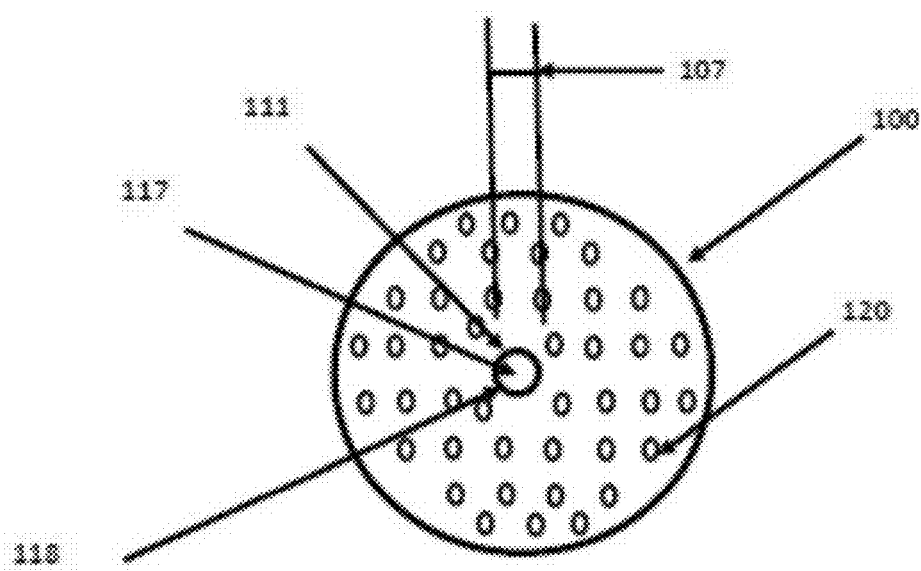
FIG. 3 shows a bottom view of an embodiment of the invention.

FIG. 3 shows a bottom view of an embodiment of the invention which is a ball 100 made from plastic and shows the detail of infusion port 111 which has hole 115 and all 116. The diameter 107 of infusion port 111 is design to fit within tube 106 so that the exhaust 510 or $CO_2$ 900 will not escape from the tube when the tube is transporting either exhaust 510 or $CO_2$ 900 when a pump 800 for infusion of $CO_2$ 900 is connected to it.

Figure 4:
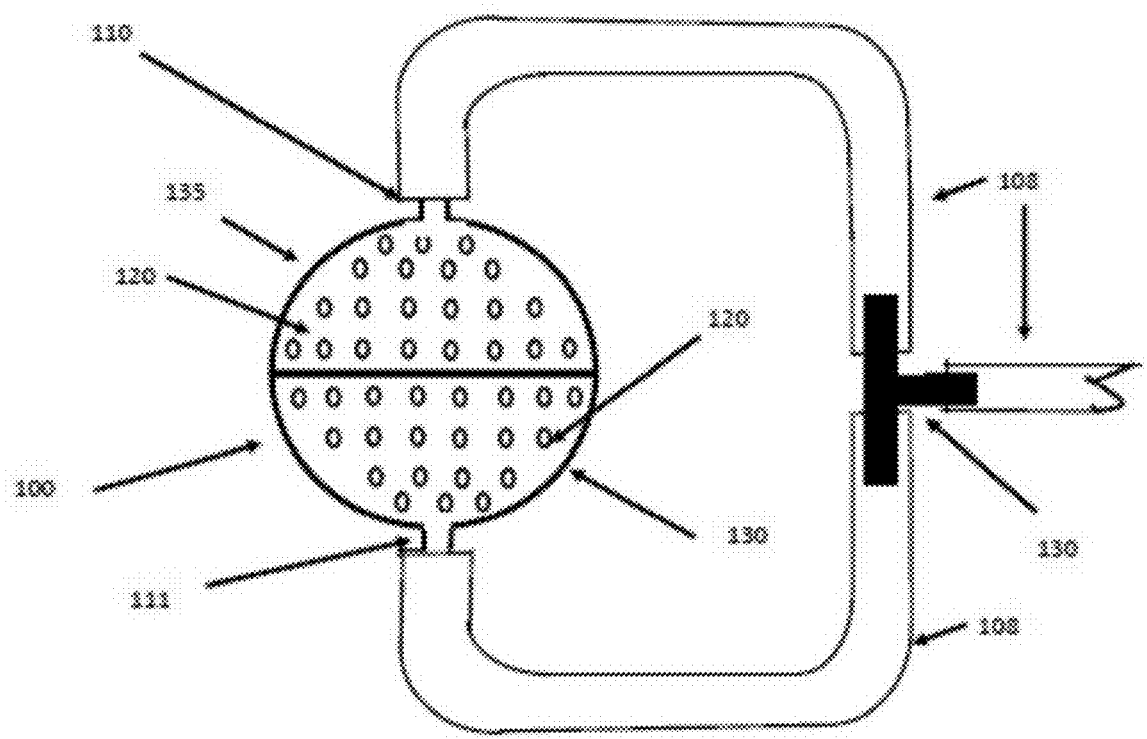
FIG. 4 shows a plan view of an embodiment of the invention connected to single supply using both inlet ports

FIG. 4 shows a plan view of an embodiment of the invention connected to a single supply tube 108 using both infusion port 110 and infusion port 111. The tee 130 is used to split flow of either exhaust 610 or $CO_2$ 900 being transported in tubing 108.

Figure 5:
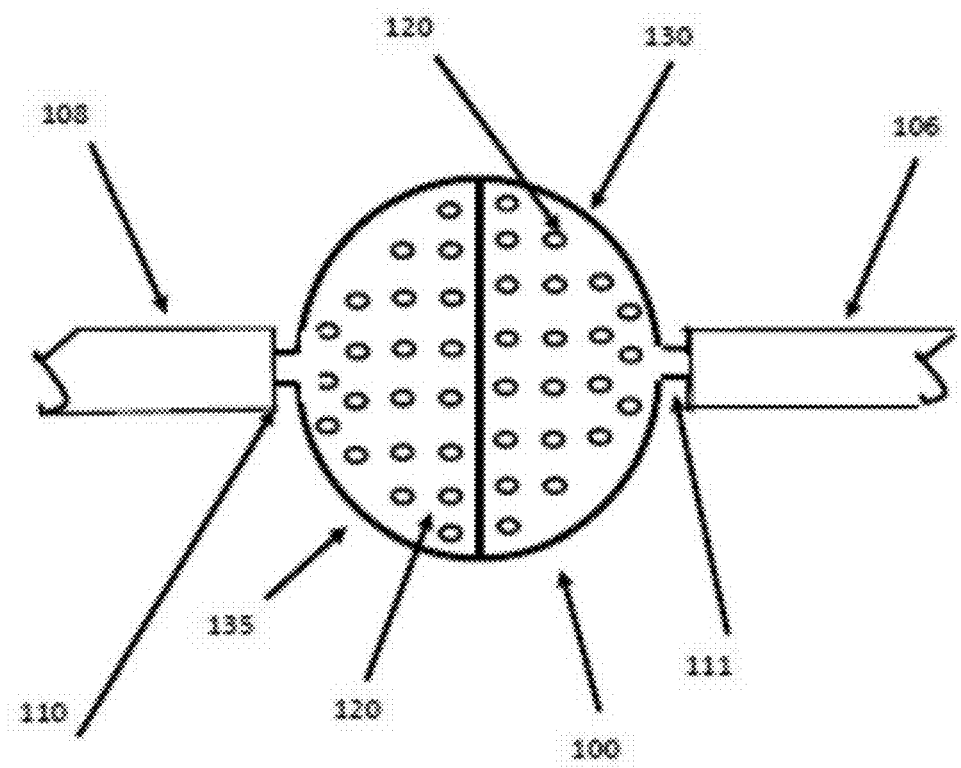
FIG. 5 shows a plan view of an embodiment of the invention with an inlet tube and outlet tube connected

FIG. 5 shows a plan view of embodiment of the invention 540 with an inlet tube and outlet tube connected to a supply tube 108 connected to infusion port 110 and supply tube 108 connected infusion port 111. The tube 108 is used to transport either exhaust 510 or $CO_2$ 900 being transported in tubing 108.

Figure 6:
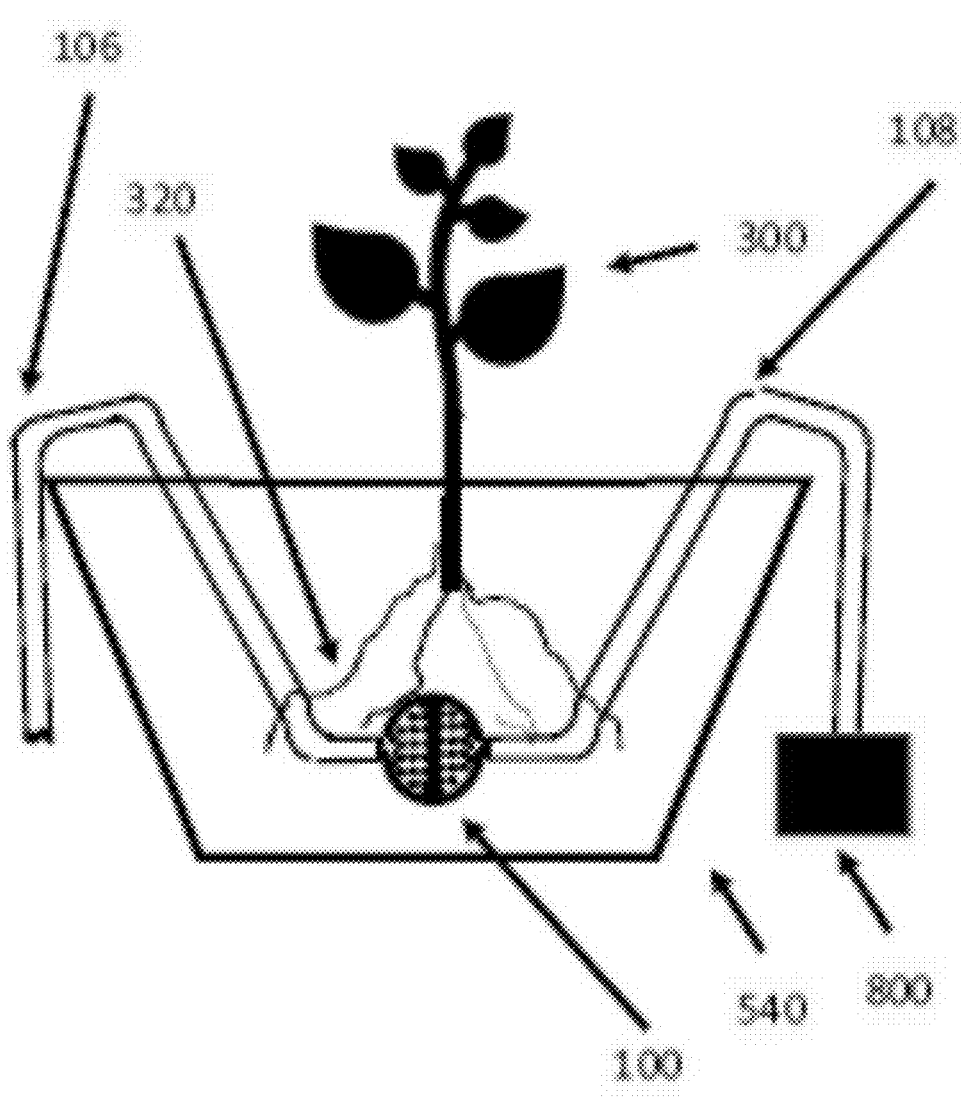
FIG. 6 shows an elevation view of the invention used with a plant in a pot and connected to a pump for infusion of $CO_2$.

FIG. 6 shows an elevation view of the invention used with a plant in a pot and connected to a pump 800 for infusion of $CO_2$.

Figure 7:
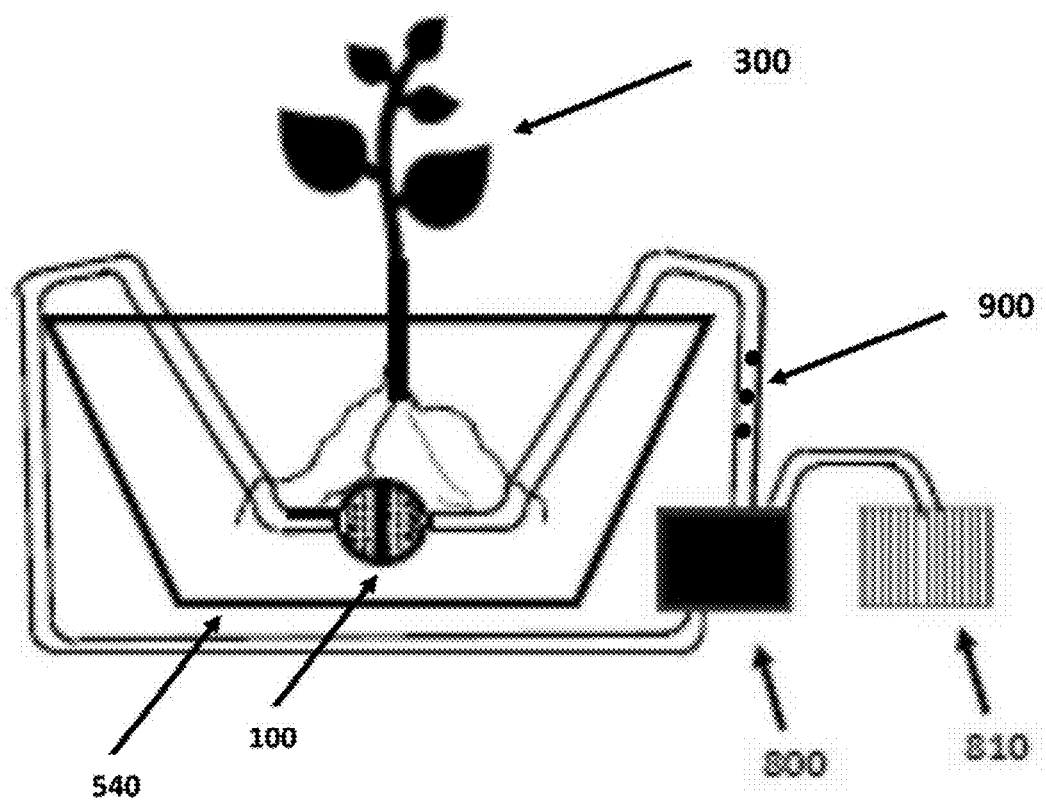
FIG. 7 shows a view of the invention used with a plant in a pot and connected to a pump for infusion of $CO_2$ and a reservoir for the infusion of water.

FIG. 7 shows a view of the invention used with a plant 300 in a pot 540 and ball 100 connected to a pump 800 for infusion of $CO_2$ 900 and a reservoir 810 for the infusion of water.

Figure 8:
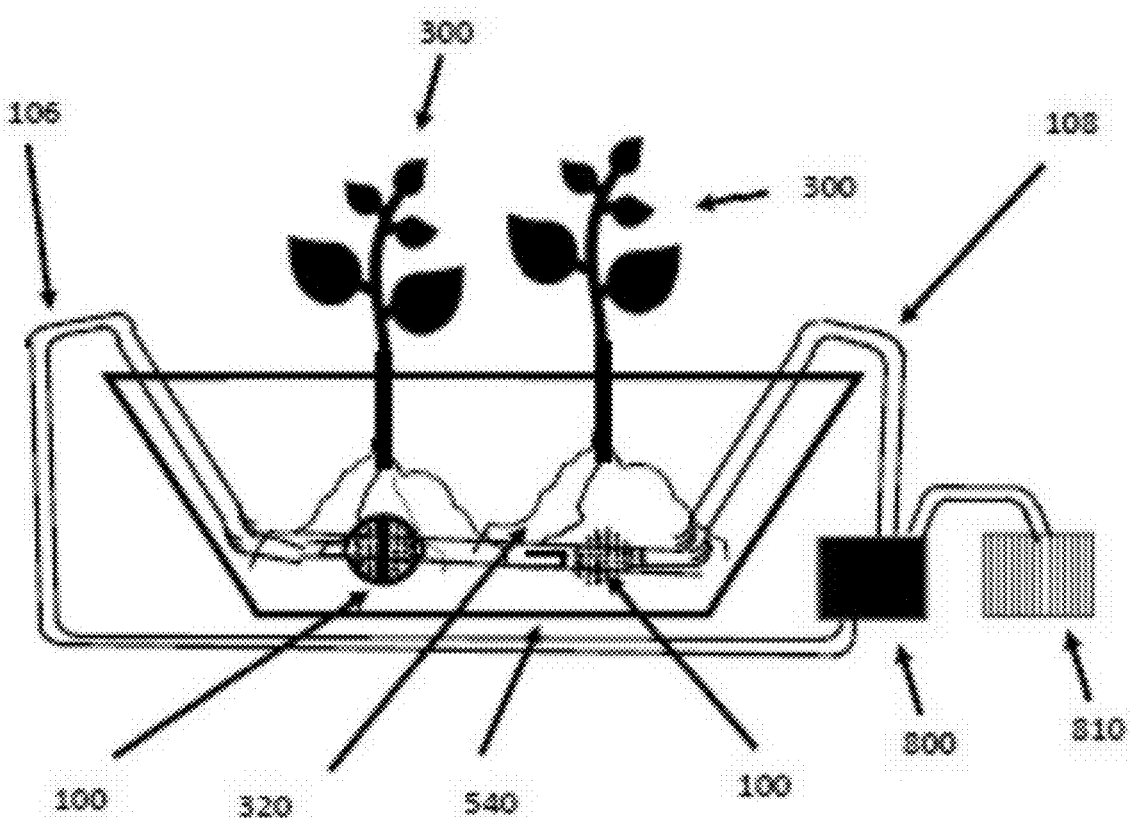
FIG. 8 shows a view of the invention used with more than one plant in a pot and connected to a pump for infusion of $CO_2$ and a reservoir for the infusion of water.

FIG. 8 shows a view of the invention used with more than one plant 300 in a pot 540 and connected to a pump 800 for infusion of $CO_2$ and a reservoir 810 for the infusion of water.

Figure 9:
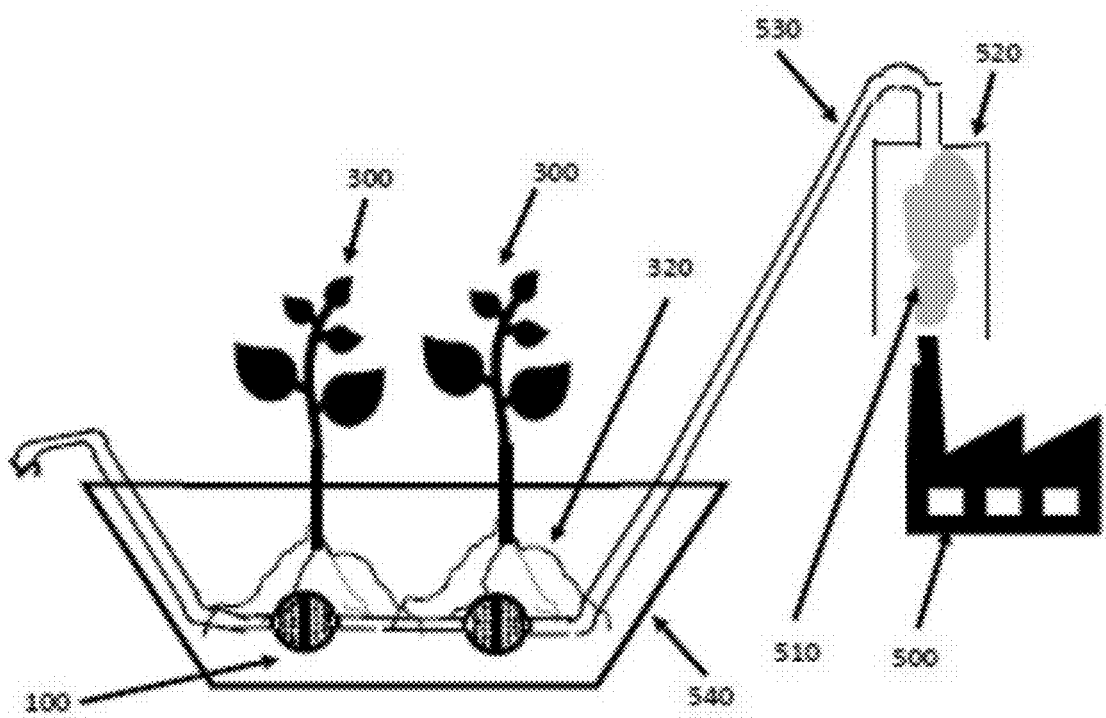
FIG. 9 shows a view of the invention used with more than one plant in a pot and connected to the exhaust source of a fossil fuel burning device.

FIG. 9 shows a view of the invention used with more than one plant 300 in a pot 540 and connected to the exhaust 510 source of a fossil fuel burning device 500. Exhaust 510 capture hood 520 is the exhaust and transfer it to the plants 300 using tube 530

Figure 10:
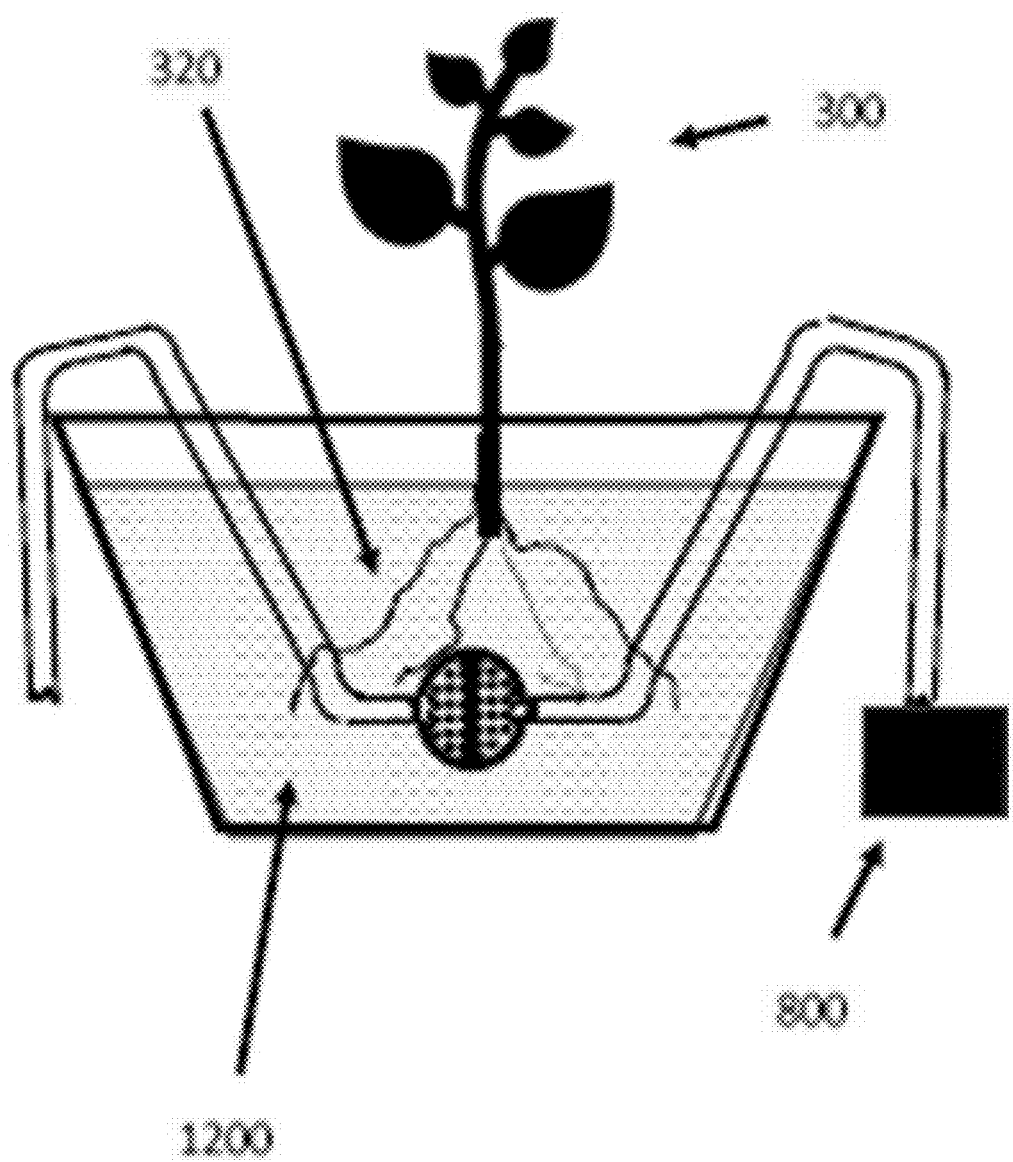
FIG. 10 shows a plan view of the invention used with a plant in a pot and connected to a pump for infusion of $CO_2$ and the grow medium around the plant roots.

FIG. 10 shows a plan view of the invention used with a plant in a pot and connected to a pump for infusion of $CO_2$ and the grow medium 1200 around the plant roots.

Figure 11:
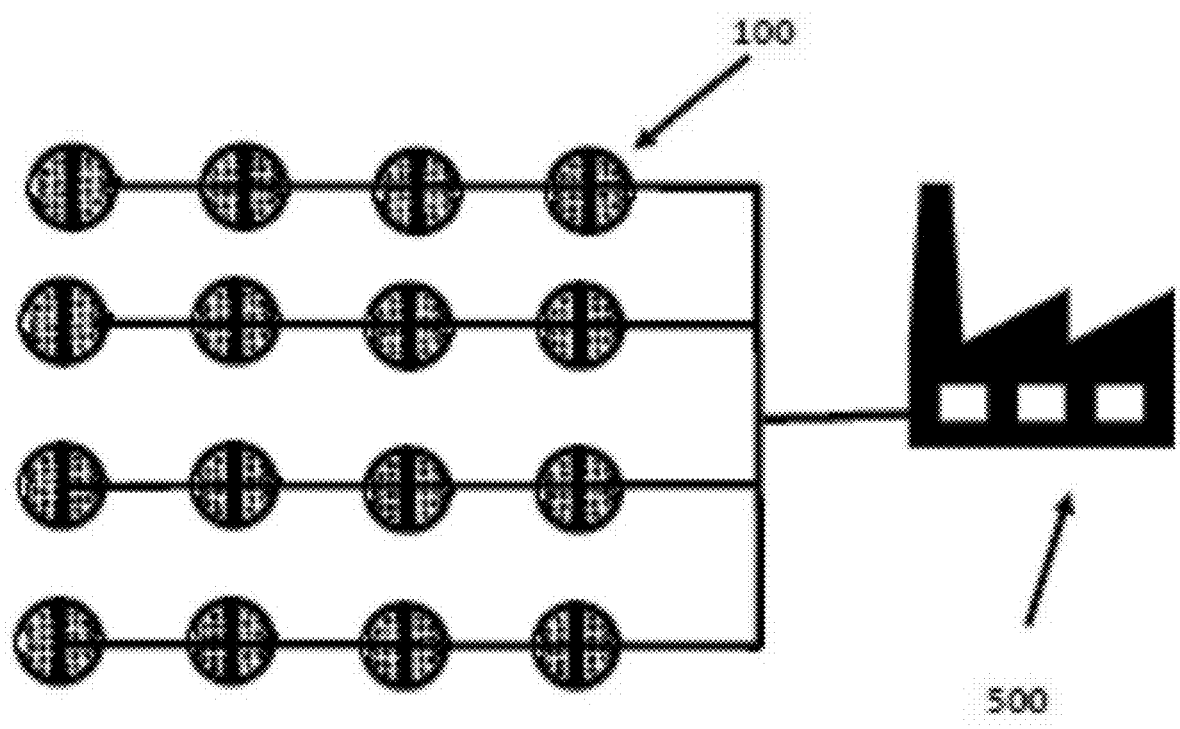
FIG. 11 shows a view of the invention used with more than one device of the invention and connected to the exhaust source of a fossil fuel burning device.

FIG. 11 shows a view of the invention used with more than one device 100 of the invention and connected to the exhaust source 500 of a fossil fuel burning device.

Figure 12:
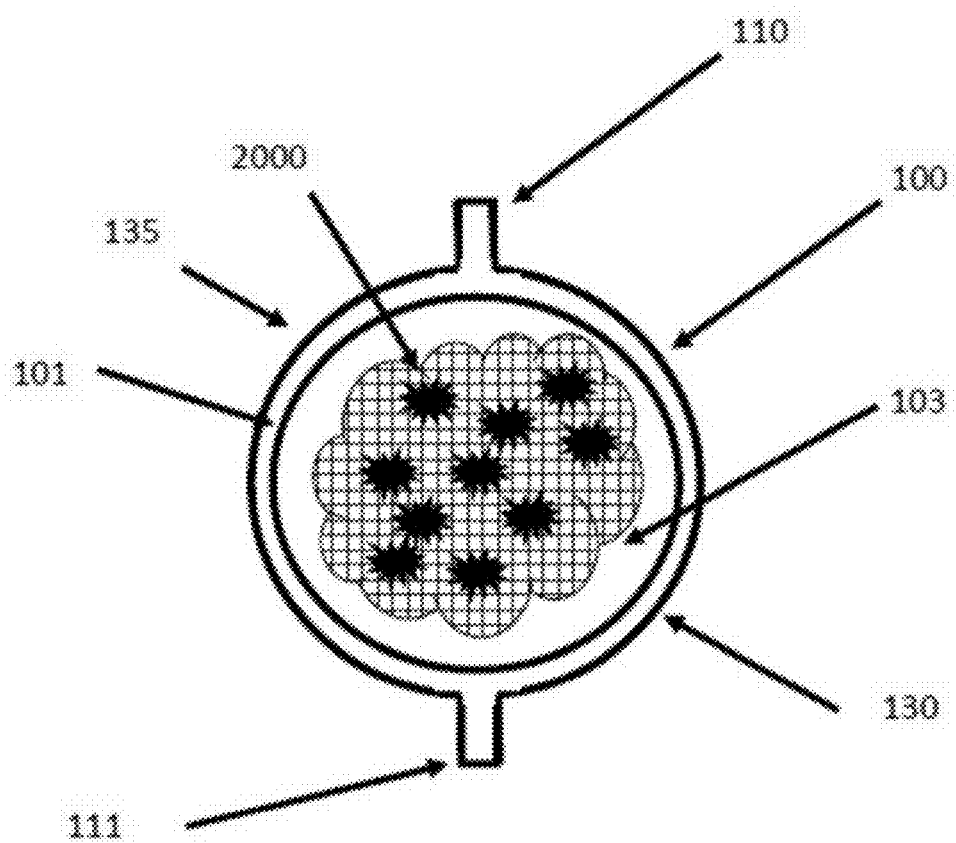
FIG. 12 shows a cross section view of the invention with a sponge contained in the cavity of the device of the invention.

FIG. 12 shows a cross section view showing a device 100 of the invention and cavity 101 containing sponge 103. Sponge 103 contains any of the following beneficial agents selected from the group consisting of silver, copper, pest control agents, disease control agents, fertilizer and Mycelia. The sponge 103 contained within the device 100 of the invention and cavity 101 provides the grower a means of dispersing beneficial agents into the fluid being just prior to infusing the fluid into the grow medium surrounding the plant roots. This provides an increase control over infusion of beneficial agents to the plant and the ability to add counter agents to mitigate any negative effects of emissions from fossil fuels contained in the fluid. These beneficial agents can be imbibed onto the surface of the sponge which provides significant available surface area due to the Menger sponge calculation which is a fractal curve. This factorial curve means that each time you follow the iteration described in Menger sponge calculation you decrease the volume of the sponge but increase its surface area. Therefore, after an infinite number of iterations, you will have removed an infinite number of cubes. The sponge will then have zero volume and infinite surface area. Therefore, if you were to execute the equation to an infinite number of iterations, the object is a fractal, that is, it contains parts that are identical to the whole thing. https://en.wikipedia.org/wiki/Menger_sponge.

Therefor by using a sponge you can store significant quantities of catalyst by adhering then to the surface area of the sponge where they are actively exposed to the fluid flowing through the sponge. Beneficial agents which can also be provided by way of the sponge also includes vanadium pentoxide and tungsten trioxide or molybdenum trioxide dispersed on a high surface area titanium dioxide. Vanadium pentoxide, in particular, is the active catalytic material for reducing NOx. Vanadium pentoxide also oxidizers $SO_2$ to $SO_3$ as an undesired side reaction. Therefore, by adding theses catalyst to the sponge in the device of the invention the amount of $SO_2$ and NOx can be minimized. The White Paper Selective Catalytic Reduction (SCR) control of NOx emissions from fossil fuel-fired electric power plants prepared by: NOx CONTROL TECHNICAL DIVISION INSTITUTE OF CLEAN AIR COMPANIES, INC., May 2009, Copyrights© Institute of Clean Air Companies, Inc., 2009 discusses the catalytic process for reducing NOx and the disclosure of such is incorporated by reference for all purpose as if fully set forth herein and the entireties of which (including all references incorporated by reference therein) are incorporated by reference herein for all purposes.

The catalyst 2000 can be formulated by taking vanadium pentoxide and titanium dioxide and mixing it in ethanol which require that significant energy be applied to the mixture similar to that found in U.S. Pat. No. 9,210,806 and is hereby incorporated by reference herein for all purposes. This mixture is made by taking 10 mg of vanadium pentoxide powder and 10 mg of titanium dioxide powder and placing it in a 300 ml suitable glass container such as a beaker. Then add 200 ml of ethanol. Then place the sonicator tip of a Branson Sonifier 450 so that it extends to approximately 2 mm from the bottom of the beaker. Set the power supply for controls accordingly to 20% Duty Cycle, Output control to 6 and timer to 8. Cover the beaker with a piece of film to prevent splatter or contamination and sonicate for 20 minutes or until the vanadium pentoxide and titanium dioxide powders are completely suspended in the ethanol and when none of the powder is resting on the bottom of the beaker. Mixture can then be imbibed into the sponge and the ethanol evaporated from the sponge leaving behind the vanadium pentoxide and titanium dioxide.

Figure 13:
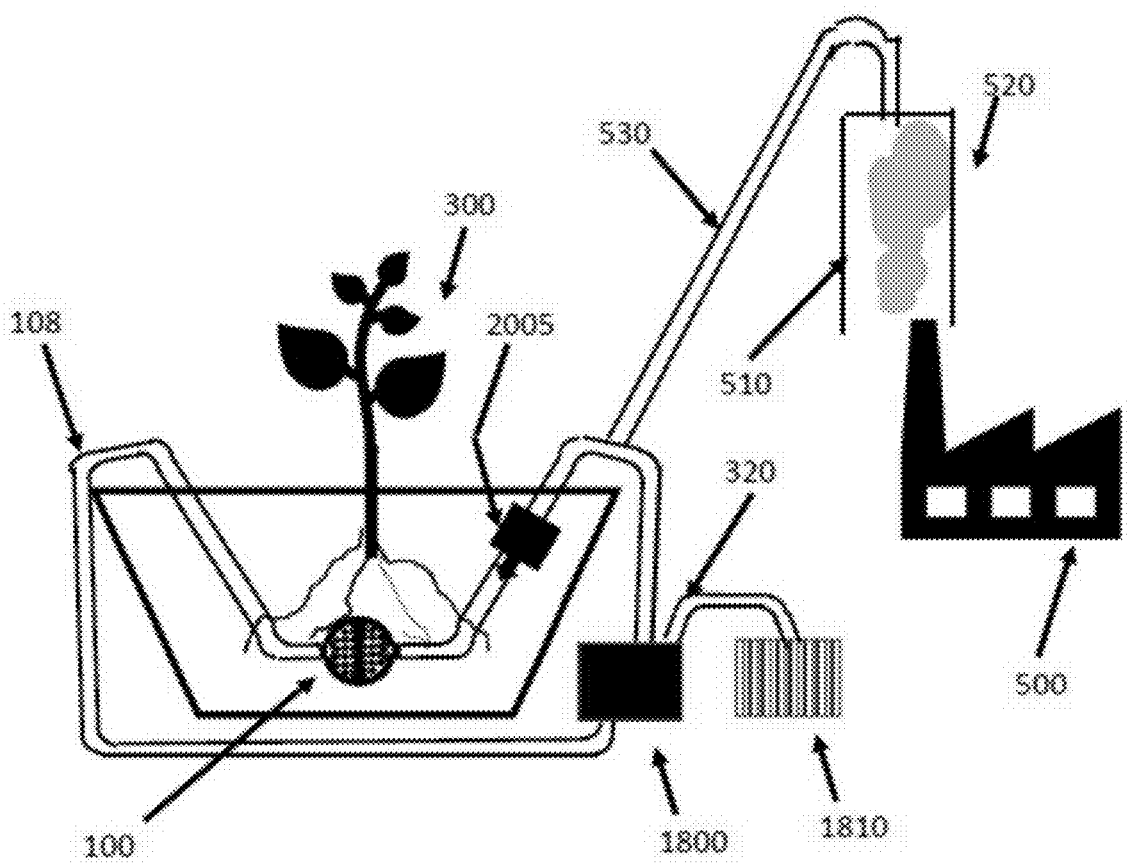
FIG. 13 shows a view of the invention with a sponge contained the cavity of the device of the invention used with a plant in a pot and connected to the exhaust source of a fossil fuel burning device.

To effectively catalyze the emissions from fossil fuels containing NOx and $SO_2$ the emissions are first mixed with Ammonia ($NH_3$) and are passed through the sponge treated with vanadium pentoxide and titanium dioxide powders. The process uses the heat from the emissions or by applying external heat to the sponge by way of a heated fluid or electrical resistance heaters 2005 to heat the ammonia and exhaust mixture. Then the heated ammonia and exhaust mixture is put in communication with the vanadium pentoxide and titanium dioxide catalyst powders which are imbibed on the surface of the sponge which processes the $NO_x$ from the exhaust to convert it to $NO_2$ plus water. This reduces the harmful $NO_x$ emissions FIG. 13 shows a typical embodiment of a $NO_x$ catalyst system used with a plant 300 in a pot 540 and ball 100 connected to a pump 1800 for infusion of $NH_3$ and a reservoir 1810 for the infusion of $NH_3$. The emissions containing NOx and SO2 are injected into the tube 108 which transports $NH_3$ to sponge 103 contained within the device 100 of the invention which has catalyst 2000 imbibed on the surface of the sponge 103. The sponge 103 when used with emissions is preferred to be a stainless steel porous metal filter product from Mott corporation however, a titanium porous metal filter has been shown to work with the catalyst as well as a titanium dioxide porous metal filter. When using the titanium dioxide porous metal filter then the catalyst solution consists of only vanadium pentoxide powder and ethanol. The catalyst solution is made as follows taking 10 mg of vanadium pentoxide powder and placing it in a 300 ml suitable glass container such as a beaker. Then add 200 ml of ethanol. Then place the sonicator tip of a Branson Sonifier 450 so that it extends to approximately 2 mm from the bottom of the beaker. Set the power supply for controls accordingly to 20% Duty Cycle, Output control to 6 and timer to 8. Cover the beaker with a piece of film to prevent splatter or contamination and sonicate for 20 minutes or until the vanadium pentoxide powder is completely suspended in the ethanol and when none of the powder is resting on the bottom of the beaker. Mixture can then be imbibed into the sponge or Mott porous metal filter made from titanium dioxide and the ethanol evaporated from the sponge leaving behind the vanadium pentoxides. When the catalyst solution has the titanium dioxide the solution is made as follows first take 10 mg of vanadium pentoxide powder and 10 mg of titanium dioxide powder and place the two powders in a 300 ml suitable glass container such as a beaker. Then add 200 ml of ethanol. Then place the sonicator tip of a Branson Sonifier 450 so that it extends to approximately 2 mm from the bottom of the beaker. Set the power supply for controls accordingly to 20% Duty Cycle, Output control to 6 and timer to 8. Cover the beaker with a piece of film to prevent splatter or contamination and sonicate for 20 minutes or until the vanadium pentoxide and titanium dioxide powder is completely suspended in the ethanol and when none of the powder is resting on the bottom of the beaker. Mixture can then be imbibed into the sponge or Mott porous metal filter made from stainless steel and the ethanol evaporated from the sponge leaving behind the vanadium pentoxide and titanium dioxide.

With either sponge type, stainless steel, titanium or titanium dioxide when the heat from the emissions and the $NH_3$ and catalyst 2000 are combined on the surface of the sponge then the reaction occurs converting the NOx to $NO_2$ plus water.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture.

Hence, while various embodiments are described with or without certain features for ease of description and illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A device adapted for a diffusion of a gas into a non-hydroponic and non-aeroponic grow medium adjacent to a root mass of a plant, said device consisting of a geometric shape, said geometric shape comprising of a wall portion and a cavity portion having, an inlet port, an outlet port and said wall portion having a plurality of holes penetrating said wall portion for diffusing said gas from said cavity portion to said grow medium and said inlet port connected to at least one tube which is connected to a source of said gas and said gas is in communication with said grow medium by way of said holes, to said cavity and said at least one tube for diffusing the said gas to said grow medium and said device is located a distance from the root mass of the plant so that the grow medium is capable of absorbing said gas and said distance providing an accumulation buffer for said gas and said cavity having a sponge portion located within said cavity portion and said sponge portion containing a beneficial agent.

2. The device of claim 1, wherein said gas is selected from a group consisting of $CO_2$, air, pest control agents, disease control agents, gas emission of a fossil fuel burning device, $O_2$ and Nitrogen.

3. The device of claim 1, wherein said gas is an emission of a fossil fuel burning device.

4. The device of claim 1, wherein the said geometric shape is selected from a group consisting of balls, round disk, triangles, rectangles, squares, octagons, pyramids, tubes or cones.

5. The device of claim 1, wherein the grow medium is selected from group consisting of soil, coco coir, perlite, peat moss, vermiculite, rockwool, growstones or clay pebbles.

6. The device of claim 1, wherein said gas is $CO_2$.

7. The device of claim 1, wherein said device is made from a material selected from a group consisting of plastic, ceramic, glass, stainless steel, copper and aluminum.

8. The device of claim 1 wherein said cavity has said sponge portion located in said cavity portion between said inlet port and said outlet port and said sponge is made from a material selected from a group consisting of stainless steel, titanium and stainless steel porous metal.

9. A device adapted for a diffusion of a gas into a non-hydroponic and non-aeroponic grow medium adjacent to root mass of a plant and said device consisting of a geometric shape, said device being located a distance from said root mass, said geometric shape comprising of a wall portion and a cavity portion, an inlet port, an outlet port, a sponge portion located within said cavity portion, said sponge portion containing a beneficial agent, and said wall as ion having a plurality of holes penetrating said wall portion for diffusing said gas, said gas being in communication with said inlet port, said outlet port, said cavity, said wall portion, said holes and said sponge with said beneficial agent and said grow medium, said gas capable of flowing through said device through two paths the first path defined as the gas moving from said inlet port to said cavity portion, to said sponge portion containing said beneficial agent, to said holes, to said grow medium, to said root mass or the second path defined as the gas moving from said inlet port to said cavity portion, to said sponge portion containing said beneficial agent, to said outlet port.

10. The device of claim 9, wherein the beneficial agent is selected from a group consisting of silver, copper, pest control agents, disease control agents, fertilizer, Mycelia, vanadium pentoxide, tungsten trioxide and molybdenum trioxide dispersed on a high surface area titanium dioxide.

11. The device of claim 9, wherein the sponge is made from material selected from a group consisting of stainless steel, titanium, and stainless steel porous metal filter.

12. The device of claim 9, wherein said gas is selected from a group consisting of $CO_2$, air, $O_2$, Nitrogen and gas emission of a fossil fuel burning device.

13. The device of claim 9, wherein said gas is $CO_2$.

14. The device of claim 9, wherein the said the grow medium is selected from a group consisting of soil, coco coir, perlite, peat moss, vermiculite, rockwool, growstones and clay pebbles.

15. A device adapted for a diffusion of a gas emission from a fossil fuel burning device into a non-hydroponic and non-aeroponic grow medium adjacent to a root mass of a plant and said device consisting of a geometric shape, said device being located a distance from said root mass, said geometric shape comprising of a wall portion and a cavity portion, an inlet port, an outlet port, a porous metal filter portion made from titanium dioxide located within said cavity portion, said porous metal filter portion containing a beneficial agent, and said wall portion having a plurality of holes penetrating said wall portion for diffusing said emission and said emission being in communication with said inlet port, said outlet port, said cavity, said wall portion, said holes and said porous metal filter with said beneficial agent and said grow medium, said emission capable of flowing through said device through two paths the first path defined as said emission moving from said inlet port to said cavity portion, to said porous metal filter portion containing said beneficial agent, to said holes, to said grow medium, to said root mass or the second path defined as said emission moving from said inlet port to said cavity portion, to said porous metal filter portion containing said beneficial agent, to said outlet port.

16. The device of claim 15, wherein the beneficial agent is selected from a group consisting of vanadium pentoxide, and tungsten trioxide.

17. The device of claim 15, wherein said grow medium is selected from a group consisting of soil, coco coir, perlite, peat moss, vermiculite, rockwool, growstones or clay pebbles.

* * * * *